Patented Feb. 6, 1951

2,540,116

UNITED STATES PATENT OFFICE 2,540,116

MANUFACTURE OF CONDENSATION PRODUCTS

Walter Huber and Albert Businger, Basel, Switzerland, assignors to Hoffmann-La Roche Inc., Nutley, N. J., a corporation of New Jersey No Drawing. Application June 7, 1947, Serial No. 753,378. In Switzerland August 19, 1946

5 Claims. (Cl. 260—632)

This invention relates to the manufacture of condensation products.

So far, no condensation products from propinyl halides, or substituted propinyl halides, and α,β-unsaturated ketones have been described.

A process for the manufacture of condensation products has now been found which comprises reacting a propinyl halide or a homologue thereof with an α,β-unsaturated ketone by means of zinc in an inert solvent, and hydrolytically decomposing the resulting zinc compounds.

The process, according to the present invention, is illustrated by the following formulae:

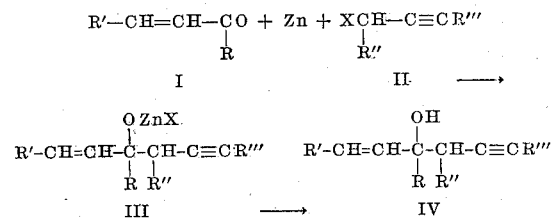

in which formulae:

X = halogen,
R = hydrocarbon radical,
R', R'', R''' = hydrogen or hydrocarbon radicals.

The α,β-unsaturated ketones I, used as starting materials, as well as propinyl halide itself ($R''=H$), are known; the homologues of a propinyl halide as depicted in general Formula II are prepared in an analogous manner to the preparation of propinyl halide.

Zinc powder proved good as a condensing agent, which agent is preferably activated by heating with a little iodine prior to the reaction. It is of advantage to work in presence of an inert solvent such as ether or a mixture of ether and benzene. The reaction is advantageously carried out at a temperature of about 40° C. To avoid the formation of peroxide, it is of advantage to add antioxidants to the reaction solution. The progress of the reaction can favourably be influenced by the addition of traces of copper ethyl acetoacetate.

The organic zinc compounds, corresponding to the general Formula III, are hydrolytically decomposed in the usual manner by means of water, dilute acids or ammonium salt solutions. The condensation products thus obtained are preferably purified by distillation.

For the purpose of separating non-reacted α,β-unsaturated ketone, the crude condensation product can be treated with the usual ketone reagents, such as sodium bisulphite, semicarbazide and the chloride of trimethylammonium acetic acid hydrazide, the α,β-unsaturated ketone being regenerated therefrom immediately afterwards.

In accordance with this process, it is, for instance, possible to prepare 3-hydroxy-3-methyl-hexene-(1)-yne-(5) by reacting propinyl bromide with methylvinyl ketone by means of zinc in ether-benzene solution and hydrolysing the resulting zinc compound. In exactly the same manner it is possible to prepare 1-(2',6',6'-trimethyl-cyclohexene-(1')-yl)-3-hydroxy-3-methyl-hexene-(1)-yne-(5) by reacting propinyl bromide with β-ionone.

The compounds obtained in accordance with the present process can be used as intermediate products in many ways, particularly for the purpose of building up compounds with a terpenoid carbon skeleton.

The following examples illustrate the process of the present invention:

Example 1

38.5 parts by weight of propinyl bromide, 65 parts by weight of methylvinyl ketone, 10 parts by weight of benzene, 50 parts by weight of ether, 0.2 part by weight of hydroquinone and 0.1 part by weight of copper-ethyl-acetoacetate are gradually added to 40 parts by weight of fine iodine-activated zinc powder with vigorous stirring and exclusion of moisture. The reaction mixture should be kept boiling continually under reflux by the reaction heat. When the reaction has come to an end the product is boiled for another 5 minutes and then cooled to 5° C. At this temperature the zinc salt formed is decomposed with 235 parts by weight of 3-N sulphuric acid and unused zinc filtered off. The aqueous layer is separated and twice extracted with ether. The united ether solutions are washed with water, dried with sodium sulphate, stabilised with hydroquinone and distilled off over a Raschig column. The residue is twice to three times fractionated in vacuo. 25 to 26 parts by weight of 3-hydroxy-3-methyl-hexene-(1)-yne-(5) are obtained as colourless, readily flowing liquid of boiling point 48° to 50° C./11 mm. Hg. $n_D^{20}=1.460$, $d_4^{18}=0.9155$. Yield calculated on propinyl bromide: 69 to 72 per cent.

Example 2

A solution of 1 part by weight of propionyl bromide, 1.3 parts by weight of β-ionone and 0.003 part by weight of copper-ethyl-acetoacetate in 4 parts by volume of ether and 0.3 part by volume of benzene is added, in the course of ½ an hour, to 1 part by weight of iodine-activated zinc powder in an atmosphere of nitrogen while stirring vigorously; the solvent being kept boiling continually under reflux by the heat evolved by the reaction. The reaction mixture is heated for another ¼ hour in an oil bath under reflux, then cooled and decomposed with ice and dilute sulphuric acid. The condensation product is taken up in ether, washed with 2 per cent, sulphuric acid and water, the solvent evaporated and distillation effected in high vacuo. For the purpose of separating non-reacted β-ionone the resulting 1.2 parts by weight of the distillate are left to stand at room temperature for 24 hours with 1.2 parts by weight of semicarbazide and 12 parts by volume of methyl alcohol. The resulting semicarbazone is filtered off, the filtrate diluted with 40 parts by volume of water and the non-ketonic part distilled off with steam. After extraction of the distillates with ether and concentration of the solvent, 0.95 part by weight of 1-(2',6',6'-trimethyl-cyclo-hexene-(1')-yl)-3-hydroxy-3-methyl-hexene-(1)-yne-(5) is obtained in the form of a slightly yellow coloured oil of boiling point 88° to 90° C./0.1 mm. Hg. $n_D^{20}=1.509$, $d_4^{25}=0.935$. Yield calculated on consumed β-ionone: 70 per cent.

*Example 3*

A solution of 1.2 parts by weight of propinyl bromide and 1 part by weight of β-ionone in 6 parts by volume of ether is added during the course of 15 minutes while vigorously stirring to 1 part by weight of warmed zinc powder activated with iodine. Application of a reflux condenser is necessary during this operation since the solvent boils consequent to the heat produced by the reaction. When the reaction dies out the mixture is heated for a few minutes, then cooled down and decomposed with ice and dilute sulphuric acid. The aqueous layer must always remain acid to Congo paper. Zinc hydroxide, which precipitates at the beginning of the reaction, is thus redissolved. The ethereal solution is washed with water, then dried with potassium carbonate and, after driving off the solvent, the residue is fractionated. The chief quantity distils over at 150–153° C. under a pressure of 12 mm./Hg. The product is identical with the compound obtained, according to Example 2. Yield calculated on consumed β-ionone 84–86 per cent.

We claim:

1. A process which comprises reacting propinyl bromide in the presence of zinc with a member selected from the group consisting of methyl vinyl ketone and β-ionone, to produce, respectively, a corresponding compound of the group consisting of those represented by the following formulae:

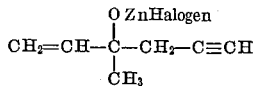

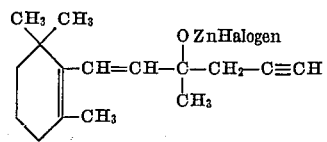

2. A process according to claim 1 in which the zinc compound which is formed is thereafter hydrolyzed to the corresponding hydroxy compound, represented, respectively, by the formulae

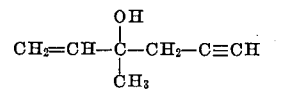

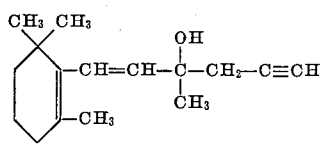

3. A process according to claim 2 in which the reaction is carried out with methyl vinyl ketone, to produce a compound of the formula

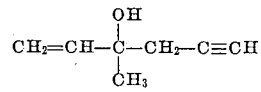

4. A process according to claim 2 in which the reaction is carried out with β-ionone, to produce a compound of the formula

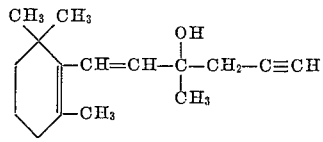

5. 3-hydroxy-3-methyl-hexene-(1)-yne-(5).

WALTER HUBER.
ALBERT BUSINGER.

REFERENCES CITED

The following references are of record in the file of this patent:

UNITED STATES PATENTS

| Number | Name | Date |
| --- | --- | --- |
| 1,963,935 | Carothers et al. | June 19, 1934 |
| 2,369,161 | Milas | Feb. 13, 1945 |
| 2,425,201 | Oroshnik | Aug. 5, 1947 |

OTHER REFERENCES

Helvetica Chimica Acta, vol. 16 (1933), pages 625 and 626 (excerpt from article by Karrer and Morf).

Berichte, vol. 75 (1942), pages 356–359 (article by Zeile and Meyer). Abstract of this article appears in Johnson, "Acetylenic Compounds," vol. I, page 68, published by Arnold & Co., London, 1946.